US008582264B2

(12) United States Patent
Durth et al.

(10) Patent No.: US 8,582,264 B2

(45) Date of Patent: Nov. 12, 2013

(54) OVERVOLTAGE PROTECTION ELEMENT

(75) Inventors: Rainer Durth, Horn-Bad Meinberg (DE); Christian Depping, Lemgo (DE); Thomas Meyer, Ottenstein (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 339 days.

(21) Appl. No.: 13/023,668

(22) Filed: Feb. 9, 2011

(65) Prior Publication Data

US 2011/0194222 A1 Aug. 11, 2011

(30) Foreign Application Priority Data

Feb. 9, 2010 (DE) ........................ 10 2010 007 428

(51) Int. Cl.
*H02H 3/20* (2006.01)

(52) U.S. Cl.
USPC ........................................................ 361/91.1

(58) Field of Classification Search
USPC ........................................................ 361/91.1
See application file for complete search history.

(56) References Cited

U.S. PATENT DOCUMENTS

| | | | | |
|---|---|---|---|---|
| 2,303,521 | A | 12/1942 | Ackermann | |
| 7,411,769 | B2 * | 8/2008 | Schimanski et al. ......... | 361/91.1 |

FOREIGN PATENT DOCUMENTS

| | | | |
|---|---|---|---|
| DE | 44 13 057 | A1 | 10/1995 |
| DE | 20 2005 009 123 | U1 | 10/2005 |
| DE | 10 2007 006 617 | B3 | 9/2008 |
| DE | 10 2008 061 323 | B3 | 6/2010 |

* cited by examiner

*Primary Examiner* — Rexford Barnie
*Assistant Examiner* — Tien Mai
(74) *Attorney, Agent, or Firm* — Roberts Mlotkowski Safran & Cole, P.C.; David S. Safran

(57) ABSTRACT

An overvoltage protection element with a housing, with at least one overvoltage limiting component which is located in the housing, with terminal elements for electrical connection of the overvoltage protection element to the current or signal path which is to be protected, and with a state display which has a display element for display of the state of the overvoltage protection element. A conclusion about the state of the overvoltage protection element is easily possible as a result of a thermally activatable, endothermic material being both in thermal contact with the overvoltage limiting component and also in mechanical contact with the display element of the state display. When the overvoltage limiting component is heated above a certain minimum temperature, expansion of the thermally activatable, endothermic material produces a change in position of the display element whose magnitude is a measure of the heating of the overvoltage limiting component.

18 Claims, 4 Drawing Sheets

OVERVOLTAGE PROTECTION ELEMENT

BACKGROUND OF THE INVENTION

1. Field of the Invention

The invention relates to an overvoltage protection element with a housing, with at least one overvoltage limiting component which is located in the housing, with terminal elements for electrical connection of the overvoltage protection element to the current or signal path which is to be protected, and with a state display which has a display element for displaying the state of the overvoltage protection element.

2. Description of Related Art

The overvoltage limiting components which are located in the overvoltage protection element, especially varistors and spark gaps, are subject to progressive degradation, i.e., an aging-induced change of the parameters of the overvoltage limiting components. The degradation process can lead over time to failure of the surge arrester during a diversion process or also under network conditions.

Varistors "age" both at the prevailing operating voltage and also for any diversion process which occurs. With progressive degradation first of all the resistance in the "nonconductive state" of the varistors decreases so that the leakage current which occurs increases; this leads to heating of the varistor. This heating of the varistor is used in the known overvoltage protection elements to trigger an isolation mechanism starting from a given temperature, which electrically isolates the varistor from the current or signal path to be protected.

In contrast to varistors, spark gaps "age" generally only during the diversion process. The arc which prevails between the electrodes of a spark gap in the case of diversion leads, on the one hand, to damage of the electrodes themselves, on the other hand, also to damage of the insulation parts surrounding the electrodes. Here, the state of the inner opponents of a spark gap is generally unknown and can also be determined only to a very limited degree by measurements within certain test cycles. In spark gaps, there is generally no isolation mechanism, as in varistors.

German Patent Application DE 44 13 057 A1 discloses a method for detection of lightning stroke or surge currents in which a premagnetized data medium is located in the three-dimensional vicinity of a conductor through which the lightning stroke or surge current has flowed; this leads to a change of the magnetization of the data medium. The change of the magnetization of the data medium can be detected and evaluated by means of a reader into which the data medium must be plugged. On the one hand, this method requires active implementation by correspondingly trained personnel, on the other only the magnetization or magnetization change which has occurred at maximum can be measured and evaluated so that for example several smaller pulses before or after the maximum surge current are not recognized. With this method thus only the maximum current intensity of a lightning stroke or surge current can be determined; a conclusion about the state of an arrester however cannot be easily drawn.

German Utility Model DE 20 2004 006 227 U1 and corresponding U.S. Pat. No. 7,411,769 B2 disclose an overvoltage protection element in which the state of a varistor is monitored according to the principle of a temperature switch so that when the varistor overheats a solder connection provided between the varistor and the interrupting element is broken; this leads to electrical isolation of the varistor. Moreover, when the solder connection is broken, a plastic element is pushed by the reset force of a spring out of a first position into a second position in which the interrupting element which is made as an elastic metal tongue is separated thermally and electrically from the varistor by the plastic element so that an arc which may prevail between the metal tongue and the contact site of the varistor is extinguished. Since the plastic element has two colored markings located next to one another, it acts additionally as an optical state display, as a result of which the state of the overvoltage protection element—serviceable (green) or isolated (red)—can be read directly on site.

German Patent Application DE 10 2007 006 617 B3 discloses an overvoltage protection element with two overvoltage limiting components which are located in one housing, in which the two overvoltage limiting components, which can be two varistor disks, are isolated individually when overheated. The breaking of one or both solder connections is indicated by an optical state display made as a rotary display. Thus, the three different states can be displayed—both varistors serviceable, one varistor no longer serviceable and isolated, neither varistor serviceable any longer and isolated. In this overvoltage protection element, the optical state display, however, only displays whether one or both varistors are serviceable or not. There is no additional display of the state of one still serviceable varistor in the known overvoltage protection elements.

SUMMARY OF THE INVENTION

Therefore, a primary object of this invention is to provide an overvoltage protection element of the initially described type which allows a conclusion to be drawn about the state of the overvoltage protection element in a manner that is as simple as possible.

This object is achieved in an overvoltage protection element of the initially described type in that a thermally activatable, endothermic material is provided which is both in thermal contact with the overvoltage limiting component and also in mechanical contact with the display element of the state display. Thus, when the overvoltage limiting component is heated above a certain minimum temperature, the display element, as a result of expansion of the thermally activatable, endothermic material, executes a change in position whose magnitude is a measure of the heating of the overvoltage limiting component.

The invention is based on the finding that, for an overvoltage limiting component, a maximum energy can be determined or established which the component can or is designed to convert over its service life without a critical change of the rated parameters of the component occurring. When this maximum energy has been converted, typical parameters of the overvoltage protection element, for example, the maximum pulse strength, the leakage current behavior or the network follow current behavior can be adversely affected so that the overvoltage protection element should be replaced. Moreover, the invention is based on the finding that energy conversion in the overvoltage limiting component always leads to heating of the component, the heating constituting a direct measure of the internal energy conversion. Starting at a component-specific temperature threshold, the heating of the component which occurs, for example, when a surge current is diverted, constitutes a proportional measure for the degradation of the overvoltage limiting component.

In the overvoltage protection element in accordance with the invention, the heat released by the overvoltage limiting component as a result of the converted energy is used for activation of an endothermic chemical or physical process. The thermally activatable, endothermic material which is in thermal contact with the overvoltage limiting component assumes both the function of a sensor which detects the heating of the overvoltage limiting component and also the function of an actuator which actuates the display element of the state display.

For processing of plastics, and for example, in applications for fire protection, various thermally activatable, endothermic materials are available on the market which produce an increase of volume under thermal action. Here, especially propellants can be used or incorporated into the materials and contain, for example, liquid gas-filled plastic beads which expand when heated as a result of the pressure rise within the sphere.

The minimum temperature from which the material expands should correspond roughly to the temperature, starting from which degradation of the overvoltage limiting component can be expected. Any heating of the overvoltage limiting component—caused by energy conversion within the component—above the minimum temperature then leads to expansion of the thermally activatable endothermic material, and thus, to a corresponding position change of the display element of the state display.

Fundamentally, there is now the possibility of detecting any position change of the display element as a result of the expansion of the endothermic material with a further measurement device in order to determine therefrom the progressive aging process of the monitored overvoltage limiting component. However, according to one preferred configuration, the thermally activatable, endothermic material is composed such that the expansion of the material which has taken place as a result of the heating of the overvoltage limiting component above a certain minimum temperature is irreversible. An expansion of the material which has taken place as a result of a certain heating thus remains even if the overvoltage limiting component and also the material have been cooled again. With any heating of the overvoltage limiting component above the minimum temperature, this yields a progressive process which constitutes an integrating measure of the amount of heat released by the overvoltage limiting component and thus correlates with the degradation of the overvoltage limiting component.

A certain change in the position of the display element of the state display can be caused both by one-time conversion of a large amount of energy and the resulting strong heating of the overvoltage limiting component and also by the following conversion of several smaller amounts of energy and the resulting repeated lower heating of the component. The damage to surge arresters, especially of spark gaps and varistors, takes place according to a nonlinear curve as a function of the pulse height and the heating. One-time very high pulses with the result of very high heating have a much higher damaging effect than several pulses of medium power and heating. Small pulses hardly heat the varistor and even for a very large number do not lead to noticeable damage. This behavior corresponds very well with the progress of the expansion of suitable propellants which below a threshold temperature show almost no reaction and when heated very strongly show a disproportionally large reaction.

According to another advantageous configuration of the invention, the amount, the arrangement and the composition of the thermally activated, endotheimic material is chosen such that the material then reaches its maximum expansion when the overvoltage limiting component has converted the amount of energy which it is designed to convert at maximum over its lifetime. If the previously determined maximum energy has been converted in the overvoltage limiting component so that the end of the prescribed service life of the component is reached, the endothermic material should also have reached its maximum expansion. In this way, the maximum positional change of the display element of the state display can be easily ascertained at the same time so that the still remaining residual service life of the overvoltage limiting component can be recognized using the position of the display element.

The thermally activatable, endothermic material can be, for example, a material with memory effect. Materials with a memory effect are both plastics and also metals, and when using the so-called one-way memory effect, the aforementioned preferred irreversible expansion of the material can be achieved.

Moreover, the thermally activatable, endothermic material can however also be an intumescent material which is composed preferably of a low melting plastic, for example, polyethylene (PE) or polypropylene (PP), and a propellant. The mixing of propellants with polyolefins and waxes has proven especially advantageous; the material becomes liquid or viscous at a temperature below the expansion temperature of the propellant. In the unheated operating state, the intumescent material can be in a solid state. When the temperature of the intumescent material rises, as a result of heating of the overvoltage limiting component, the intumescent material changes its aggregate state and becomes liquid. After exceeding a certain temperature, the intumescent material reacts with a strong increase of volume; the intumescent material foams up.

This increase of volume of the intumescent material caused by the temperature rise can be used in the overvoltage protection element in accordance with the invention to change the position of the display element of the state display. If the intumescent material is heated only for a short time or only to a relatively low temperature above the minimum temperature, this leads to only one part of the intumescent material reacting, i.e., foaming up. The increase in the volume of the intumescent material then intentionally constitutes a measure of the heating of the intumescent material, and thus, a measure of the energy conversion in the overvoltage limiting component.

There are various possibilities with respect to the arrangement of the thermally activatable, endothermic material relative to the overvoltage limiting component and relative to the display element of the state display, that arrangement being advantageous which ensures good thermal contact as continuous as possible between the overvoltage limiting component and the material.

According to one preferred mechanical configuration of the invention, between the thermally activatable, endothermic material and the display element of the state display, there is a bar-shaped actuating element which is connected on one end to the display element and on its other end to a piston. The thermally activatable material is located in a housing in which the piston and a part of the actuating element are also movably arranged so that the piston in the housing (which acts as a type of cylinder) can be pushed by the material which is expanding. The housing which holds the endotheimic material and the piston as well as a part of the actuating element is in thermal contact with the overvoltage limiting component, for which the housing can be attached directly to the outside of the overvoltage limiting component, for example, a disk-shaped varistor. Here, it has proven advantageous if the housing is made of a material of high thermal conductivity, especial a thermal conductivity which is greater than that of the thermally activatable, endothermic material. This can largely reduce the danger of thermal decoupling by an already partially expanded material.

In order to achieve expansion of the thermally activatable, endothermic material which increases as linearly as possible over temperature, there can be a spring element within the housing whose spring force counteracts the pressure force which acts when the thermally activatable, endothermic material expands. The spring element which can be, for example, a cylindrical spring can be clamped, for example, between the side of the piston of the actuating element facing away from the endothermic material and the opposite inner wall of the housing and can concentrically surround the actuating element.

To ensure heating of the thermally activatable, endothermic material as superficially and uniformly as possible, according to another preferred configuration of the invention, there are several thermoconductive elements arranged within the housing such that the thermoconductive elements, on the one hand, are connected to the housing by heat conduction, and on the other hand, are in thermal contact with the thermally activatable material. The thermoconductive elements are preferably made in one piece with the housing. If the thermally activatable, endothermic material is an intumescent material, the thermoconductive elements project preferably into the intumescent material or are surrounded by the intumescent material, the thermoconductive elements having a length which is greater than the corresponding extension of the intumescent material in the unexpanded state. This ensures that, in the already (partially) expanded state of the intumescent material, good heat delivery into the intumescent material takes place via the thermoconductive elements.

Alternatively or additionally, according to one configuration, an active heating element can be used which is in thermal contact with the thermally activatable, endothermic material so that heating of the actively heating element leads to heating of the thermally activatable endothermic material. So that the active heating element is only heated when the overvoltage limiting component is heated, the actively heating element is connected in series to the overvoltage limiting component. A leak current which is flowing through the overvoltage limiting component likewise then flows through the heating element; this leads to the desired heating of it. Good thermal contact between the actively heating element and the endothermic material can be ensured in that the heating element is embedded in the endothermic material. The active heating element can be, for example, a semiconductor resistor, especially a cold conductor (PCT resistor).

It was initially stated that the state display has a display element. The state display, in the simplest case, can be only an optical state display, then the optical state display, in addition to the display element has another optical display means, especially a display scale. Moreover, however, the display element can also interact with an electrical display means, especially a sliding potentiometer so that the state display constitutes not only an optical, but at the same time also an electrical state display. The electrical display can be used especially also for remote reporting of the state of the overvoltage protection element to a control station.

If the state of the overvoltage limiting component is not only to be displayed via an analog display scale, it is also possible to assign the display element a means for digitization of the position change of the display element. For this purpose, especially an incremental transmitter can be used. A value which has been digitized in this way can then be especially easily further processed.

According to another preferred configuration of the overvoltage protection element in accordance with the invention, there is an additional switch which is actuated when the thermally activatable, endothermic material reaches its maximum expansion. The actuation of the switch can take place preferably via the end of the rod-shaped actuating element which is also connected to the display element. When the switch is actuated, another display is activated which can electrically, optically and/or acoustically display the end of the service life of the overvoltage limiting component. The switch can, in turn, be used preferably for remote reporting of the state of the overvoltage protection element.

In particular, there is now a plurality of possibilities for embodying and developing the overvoltage protection element in accordance with the invention. For this purpose reference is made both to the claims subordinate to claim 1 and also to the following description of preferred embodiments in conjunction with the drawings.

DETAILED DESCRIPTION OF THE INVENTION

Figure 1:
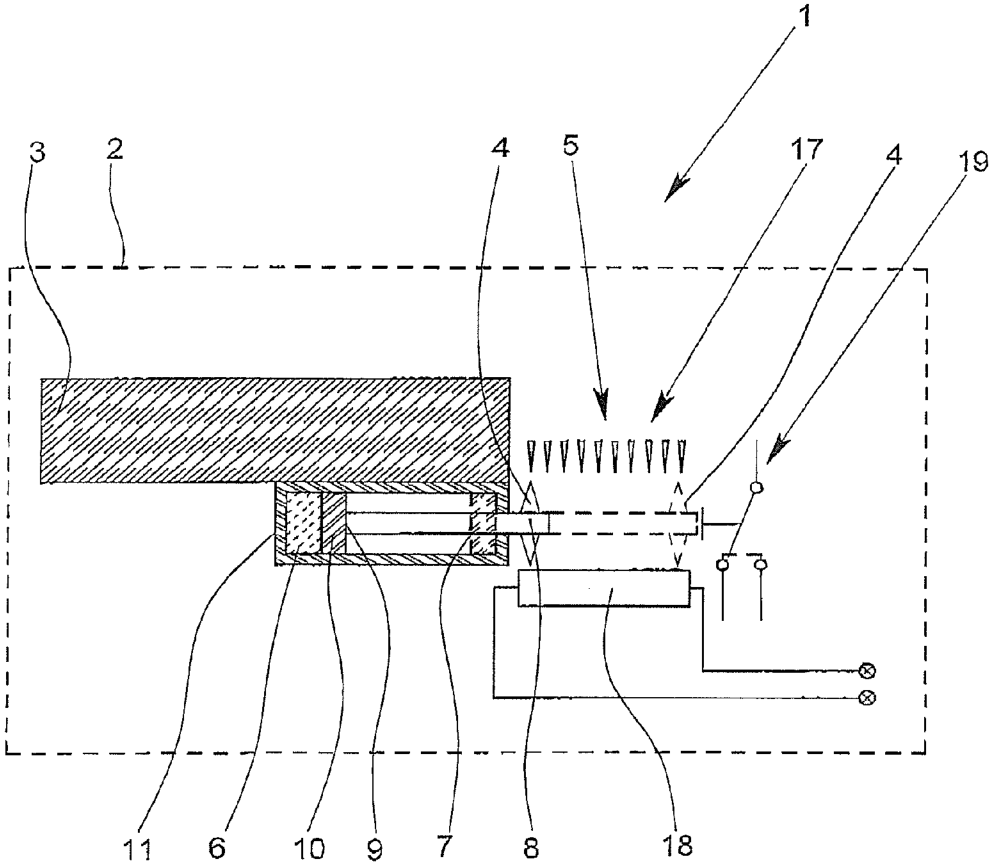
FIG. 1 shows a schematic of a first embodiment of the overvoltage protection element in accordance with the invention.
Figure 2:
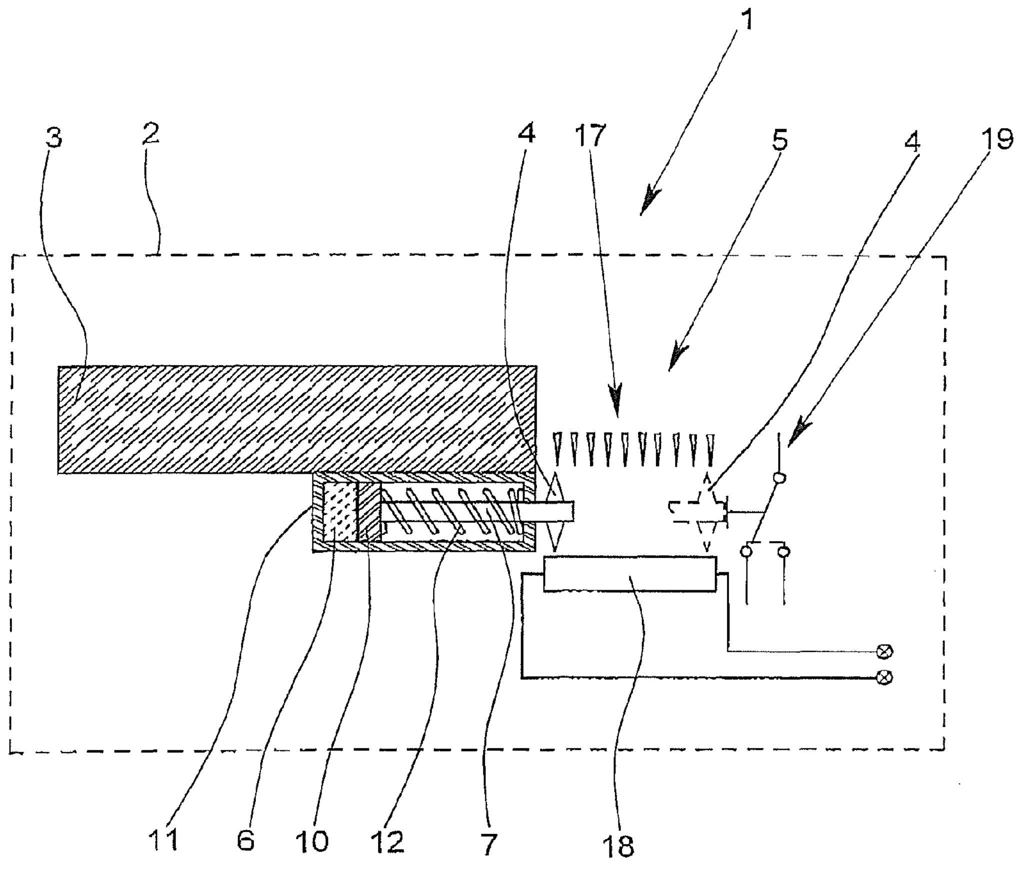
FIG. 2 shows a schematic of a second embodiment of the overvoltage protection element in accordance with the invention.

The figures show different exemplary embodiments of an overvoltage protection element 1 in accordance with the invention with a housing 2 which is shown with broken lines in FIGS. 1 and 2 and in which there is an overvoltage limiting component 3 which is shown schematically and which can be a varistor, for example. However, the overvoltage limiting component can also, fundamentally, be a spark gap or a gas-filled surge arrester. The overvoltage protection element 1, moreover, includes another state display 5 which has a display element 4, the state display in the practical implementation of the overvoltage protection element 1 being located in the housing 2 such that the state display 5 can be recognized from outside the housing 2, for example, through a corresponding viewing window.

In the overvoltage protection element 1 in accordance with the invention, there is a thermally activatable, endothermic material 6 which is, for example, an intumescent material in thermal contact with the overvoltage limiting component 3 such that heating of the overvoltage limiting component 3 above a certain minimum temperature leads to a corresponding expansion of the material 6. Since the material 6 is mechanically connected to the display element 4 of the state display 5 via a rod-shaped actuating element 7, expansion of the thermally activatable, endothermic material 6 leads to a change in the position of the display element 4, the magnitude of the change of the position being a measurement of the heating of the overvoltage limiting component 3 and thus also a measure of the degradation of the component 3.

In the exemplary embodiments shown in the figures, one end 8 of the rod-shaped actuating element 7 is directly connected to the display element 4; the display element 4, which is triangular in the exemplary embodiments, is attached to the end 8 of the rod-shaped actuating element 7. A piston 10 is attached to the opposite end 9 of the actuating element 7, the piston 10 together with part of the rod-shaped actuating element 7 being movably located in a housing 11 which acts as a cylinder. Since there is also intumescent material 6 in the housing 11 on the side of the piston 10 facing away from the actuating element 7, the piston 10 is pushed by expansion of the material 6 within the housing 11—to the right as shown in FIGS. 1 to 4—so that the display element 4 is displayed in the region of the state display 5.

FIGS. 1 and 2 show the display element 4 both in the unheated, i.e., unexpanded state of the thermally activatable, endothermic material 6 (solid line) and also in the maximally expanded material 6 (broken line) in which the display element 4 is in its end position which indicates the end of the service life of the overvoltage limiting component 3.

In the exemplary embodiment of the overvoltage protection element 1 in accordance with the invention as shown in FIG. 2, a spring element 12 in the form of a cylindrical spring is arranged within the housing 11 concentrically with respect to the rod-shaped actuating element 7. The cylindrical coil spring 12 is supported, on the one hand, on the side of the piston 10 which faces away from the intumescent material 6, and on the other hand, on the opposite facing inner wall 13 of the housing 11. The spring force of the cylindrical spring 12 thus counteracts the force which acts on the piston 10 when the material 6 expands. Thus, the force-path characteristic of the actuating element 7, and thus, also the displacement of the display element 4 can be set by a corresponding choice of the characteristic of the spring 12 such that the change in the position of the display element 4 rises as linearly as possible relative to the degree of degradation of the overvoltage limiting component 1

Figure 3A:
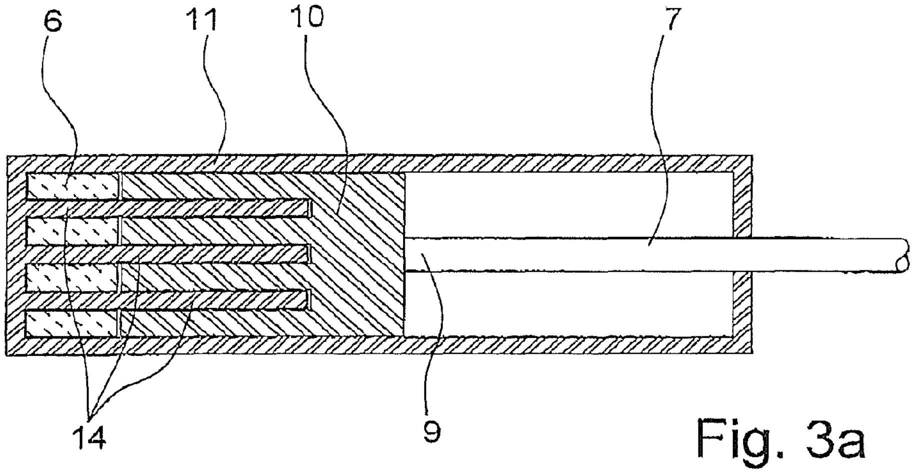
FIGS. 3*a* & 3*b* show another embodiment of a part of the overvoltage protection element in accordance with the invention, with an intumescent material which has not expanded, and with one which has partially expanded, respectively.
Figure 3B:
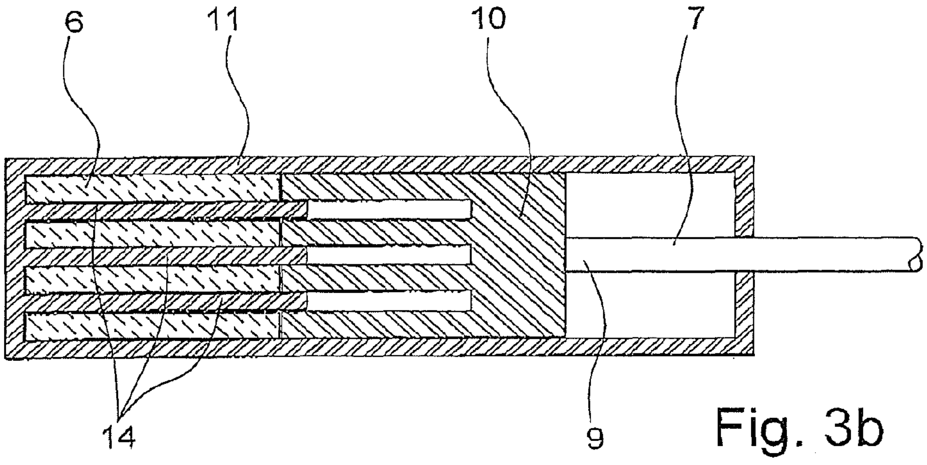

FIGS. 3 and 4 each show only part of the overvoltage protection element 1 in accordance with the invention, specifically only the housing 11 with the intumescent material 6 located in it, the piston 10 and part of the rod-shaped actuating element 7. In the exemplary embodiment as shown in FIG. 3, the housing 11 has several thermoconductive elements 14 which extend in the lengthwise direction of the housing 11, and thus, also in the displacement direction of the piston 10. The arrangement of the thermoconductive elements 14 feeds the heat transferred from the overvoltage limiting component 3 into the housing 11 over a large area into the intumescent material 6 so that the material 6 is heated relatively uniformly. Since the length of the thermoconductive elements 14 is greater than the corresponding extension of the intumescent material 6 in the unexpanded state (FIG. 3*a*) good heat delivery into the intumescent material 6 is ensured when it has already somewhat expanded (FIG. 3*b*).

Figure 4A:
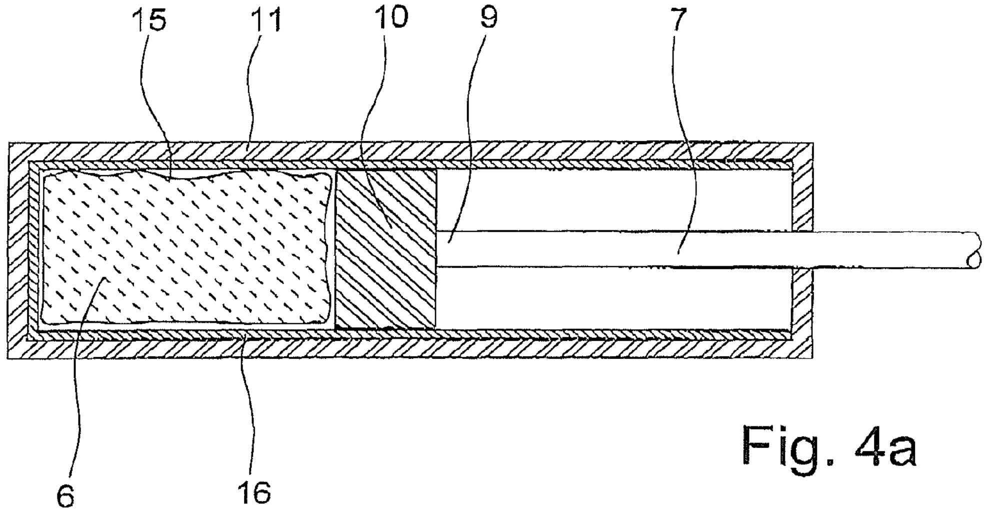
FIGS. 4*a* & 4*b* show another embodiment of a part of the overvoltage protection element in accordance with the invention, with an intumescent material which has not expanded, and with one which has completely expanded, respectively.
Figure 4B:
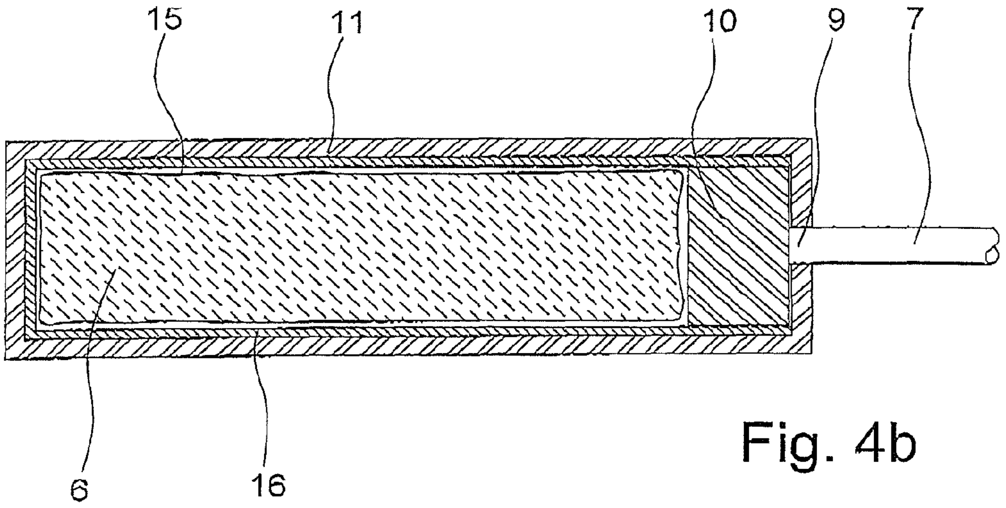

FIG. 4 also shows two representations of the housing 11, one with an unexpanded intumescent material 6 (FIG. 4*a*) and one with a maximally expanded intumescent material 6 (FIG. 4*b*). In contrast to the exemplary embodiment as shown in FIG. 1, the intumescent material 6 is located within the housing 11 in an additional flexible jacket 15 so that when the material 6 expands, one of the force must be expended for stretching of the jacket 15. The jacket 15 is used especially also to prevent cementing of the expanding intumescent material 6 on the inside wall of the housing 11. In order to reduce the friction between the jacket 15 and the inner wall of the housing 1,1 and between the inner wall of the housing 11 and the opposite surfaces of the piston 10, in the exemplary embodiment shown in FIGS. 4*a* & 4*b*, a sliding layer 16 is applied to the inner wall surfaces of the housing 11.

FIGS. 1 and 2 show that, for ease of reading of the position of the display element 4, the state display 5 has an optical display means 17 in the form of a display scale. Using the display scale 17, the remaining service life of the overvoltage limiting component 3 can be easily determined so that it can be promptly and easily recognized directly on site when an overvoltage protection element 1 should be replaced.

Moreover, the display element 4 is also connected to an electrical display means 18 in the form of a sliding potentiometer so that the state of the overvoltage protection element 1 can also be electrically detected or displayed at a central location via corresponding remote reporting. Finally, the overvoltage protection element 1 has a switch 19 which is actuated when the thermally activatable, endothermic material 6 reaches its maximum expansion. An additional display can then be activated via the switch 19 and electrically, optically and/or acoustically displays the end of the service life of the overvoltage limiting component 3. The switch 19 can also be made as a remote reporting contact such that simple remote monitoring of the state of the overvoltage protection element 1 is possible.

What is claimed is:

1. Overvoltage protection element, comprising:

a housing, at least one overvoltage limiting component which is located in the housing (2), terminal elements for electrical connection of the overvoltage protection element to a current or signal path which is to be protected, and a state display which has a display element for displaying the usage state of the overvoltage protection element, wherein a thermally activatable, endothermic material is provided in thermal contact with the overvoltage limiting component and also in mechanical contact with the display element of the state display, wherein the thermally activatable, endothermic material is expandable in response to heating of the overvoltage limiting component above a certain minimum temperature, wherein the display element is movable by expansion of the thermally activatable, endothermic material, the degree to which the display element is moved being providing a measure of the heating of the overvoltage limiting component, and wherein the thermally activatable, endothermic material is a material which is irreversibly expanded as a result of the heating of the overvoltage limiting component above said minimum temperature.

2. Overvoltage protection element in accordance with claim l, wherein the amount, arrangement and the composition of the thermally activatable, endothermic material is chosen such that the material reaches its maximum expansion when the heat transferred thereto represents the overvoltage limiting component having reached the end of its service life.

3. Overvoltage protection element in accordance with claim 1, wherein the thermally activatable, endothermic material is an intumescent material.

4. Overvoltage protection element in accordance with claim 3, wherein the intumescent material is composed of a low melting plastic and a propellant, wherein the low melting plastic becomes liquid or viscous at a temperature below the expansion temperature of the propellant.

5. Overvoltage protection element in accordance with claim 1, wherein a rod-shaped actuating element is disposed between the thermally activatable, endothermic material, and the display element, the rod-shaped actuating element being connected at one end to the display element and to a piston at an opposite end, and wherein the thermally activatable, endothermic material is located in a cylinder housing in which the piston and part of the actuating element are movably arranged.

6. Overvoltage protection element in accordance with claim 5 wherein a spring element is disposed within the cylinder housing, the spring being arranged to exert a spring force directed to counteract a pressure force produced by expansion of the thermally activatable, endothermic material.

7. Overvoltage protection element in accordance with claim 5, wherein at least one thermoconductive element is arranged within and connected to the cylinder housing in a heat conductive manner, the at least one thermoconductive element being in thermal contact with the thermally activatable, endothermic material.

8. Overvoltage protection element in accordance with claim 7, wherein the thermoconductive element has a length that is greater than a corresponding length of the thermally activatable, endothermic material in an unexpanded state.

9. Overvoltage protection element in accordance with claim 1, further comprising an active heating element in thermal contact with the thermally activatable, endothermic material and being connected in series with the overvoltage limiting component.

10. Overvoltage protection element in accordance with claim 9, wherein the active heating element is a cold conductor embedded in the thermally activatable, endothermic material.

11. Overvoltage protection element in accordance with claim 1, wherein the thermally activatable, endothermic material is surrounded by a flexible jacket.

12. Overvoltage protection element in accordance with claim 1, wherein the display element interacts with an optical display means, and also with an electrical display means.

13. Overvoltage protection element in accordance with claim 12, wherein said optical display means is a display scale and wherein said electrical display means is a sliding potentiometer.

14. Overvoltage protection element in accordance with claim 1, wherein the display element is connected to a means for digitization of the position change of the display element.

15. Overvoltage protection element in accordance with claim 14, wherein said means for digitization comprises an incremental transmitter.

16. Overvoltage protection element in accordance with claim 1, wherein a switch is positioned for being actuated by the thermally activatable, endothermic material when the material reaches its maximum expansion, wherein said switch is connected for actuating an additional display when the switch is actuated by the thermally activatable, endothermic material, and wherein said additional display is operative for at least one of electrically, optically and acoustically indicating that the end of the service life of the overvoltage limiting component has been reached.

17. Overvoltage protection element, comprising:

a housing, at least one overvoltage limiting component which is located in the housing, terminal elements for electrical connection of the overvoltage protection element to a current or signal path which is to be protected, and a state display which has a display element for displaying the usage state of the overvoltage protection element, wherein a thermally activatable, endothermic material is provided in thermal contact with the overvoltage limiting component and also in mechanical contact with the display element of the state display, wherein the thermally activatable, endothermic material is expandable in response to heating of the overvoltage limiting component above a certain minimum temperature, wherein the display element is movable by expansion of the thermally activatable, endothermic material, the degree to which the display element is moved being providing a measure of the heating of the overvoltage limiting component, and wherein a rod-shaped actuating element is disposed between the thermally activatable, endothermic material, and the display element, the rod-shaped actuating element being connected at one end to the display element and to a piston at an opposite end, and wherein the thermally activatable, endothermic material is located in a cylinder housing in which the piston and part of the actuating element are movably arranged.

18. Overvoltage protection element in accordance with claim 17, wherein a spring element is disposed within the cylinder housing, the spring being arranged to exert a spring force directed to counteract a pressure force produced by expansion of the thermally activatable, endothermic material.

* * * * *